United States Patent [19]  [11]  4,248,988
Halasa  [45]  Feb. 3, 1981

[54] PROCESS FOR THE PREPARATION OF CYCLIZED POLYMERIC DIENES

[75] Inventor: Adel F. Halasa, Bath, Ohio

[73] Assignee: The Firestone Tire & Rubber Company, Akron, Ohio

[21] Appl. No.: 85,847

[22] Filed: Oct. 18, 1979

[51] Int. Cl.$^3$ ............................. C08F 4/26; C08F 4/80
[52] U.S. Cl. ................................... 526/141; 525/334; 525/387; 526/140; 526/144; 526/335; 526/339; 526/340
[58] Field of Search ....................... 526/144, 140, 141

[56] References Cited

U.S. PATENT DOCUMENTS

| | | | |
|---|---|---|---|
| 3,428,699 | 2/1969 | Schleimer | 526/140 |
| 3,560,459 | 2/1971 | Kennedy | 526/144 |
| 3,814,744 | 6/1974 | Yagi et al. | 526/144 |
| 4,176,219 | 11/1979 | Makino et al. | 526/144 |

Primary Examiner—Stanford M. Levin

[57] ABSTRACT

The process described herein comprises the polymerization of a conjugated diene, such as butadiene-1,2, isoprene, etc., in an anhydrous hydrocarbon solution and in intimate contact with a catalyst system comprising a cobalt or nickel component, a hydrocarbyl aluminum compound and a halogenated hydrocarbon, such as $CCl_4$, $CH_2Cl_2$, $CBr_4$, $CHCl_3$, $CHBr_3$, etc., containing 1–10 carbon atoms and 1–6 halogen atoms per molecule, with at least one of said halogen atoms being attached to an aliphatic carbon atom. Analysis shows that the polymer product has cyclic structure and this is confirmed by the determination of residual unsaturation which is found generally to be less than 20 percent of the normal unsaturation of the polymeric diene. The products are useful in molding compositions.

32 Claims, No Drawings

PROCESS FOR THE PREPARATION OF CYCLIZED POLYMERIC DIENES

BACKGROUND OF THE INVENTION

1. Field of the Invention

This invention relates to a process for preparing cyclized polymers of conjugated hydrocarbon dienes. More particularly it relates to the polymerization of such dienes in the presence of a catalyst system comprising a cobalt or nickel component, a hydrocarbyl aluminum and a halogenated hydrocarbon such as $CCl_4$, $CHCl_3$, $CH_2Cl_2$, etc.

2. Related Prior Art

A pertinent reference relating to cyclized polymers of conjugated dienes is the article by M. A. Golub entitled "Thermal Rearrangements of Unsaturated Polymers" which appeared in Vol. 51 of "Rubber Chemistry and Technology", pages 677–685. However the disclosures therein pertain to preformed polymers having unsaturated side chains which are post-reacted thermally to form cyclic structures. There is no disclosure of cyclic structures formed during or immediately upon polymerization.

A number of patents disclose anionic catalyst systems somewhat resembling those used in the present invention. However, none of these show the production of cyclized polymers from monomeric conjugated dienes.

For example, U.S. Pat. No. 3,084,144 describes the polymerization of fluorine-containing polymerizable compounds using titanium tetrachloride with aluminum alkyl compounds, including trialkyl aluminum together with a chlorine-containing compound such as $CCl_4$, $CH_2Cl_2$, etc. While reference is made to the use of other halides, including those of cobalt in place of the titanium tetrachloride, there is no teaching or indication of the formation of cyclic polymer products.

U.S. Pat. Nos. 3,476,830 and 3,489,823 are concerned with the production of block copolymers of butadiene. In discussing the solvents that may be used in the polymerization, reference is made to "indifferent liquids" and after listing a number of aliphatic and aromatic hydrocarbons patentee adds "and halogenated derivatives of these hydrocarbons such as chloroform, bromobenzene and methylene chloride . . . ". However no reference is made to the production of cyclized polymers nor is there any reference to the fact that the polymerization with halogenated hydrocarbons produces products any different from those produced with hydrocarbon solvents.

SUMMARY OF THE INVENTION

In accordance with the present invention it has been found that cyclized polymers can be prepared by polymerizing a conjugated hydrocarbon diene, such as butadiene, isoprene, etc. in liquid phase, in concentrations of 10–15 percent, preferably 25–40 percent by weight, in a hydrocarbon solvent such as hexane, toluene, cyclohexane, etc. in the presence of a catalyst composition comprising:

(a) a cobalt-containing or nickel-containing component which may be a cobalt or nickel salt or a complex of a cobalt or nickel salt with an oxygen-containing or nitrogen-containing group, either in the same compound or in a separate compound;

(b) a reducing agent comprising $AlR_3$, $AlR_2X$, $AlRX_2$ and $AlR_2H$, wherein R represents a hydrocarbon radical of 1–8 carbon atoms and X represents a halogen atom, and (c) a halogenated hydrocarbon containing 1–10 carbon atoms and 1–6 halogen atoms per molecule with at least one of said halogen atoms being attached to an aliphatic carbon atom in said halogenated hydrocarbon.

In this catalyst composition the proportion of Co or Ni to monomer is in the range of 0.01–1.0, preferably 0.02–0.1 millimoles of Co or Ni compound per 100 gms of monomer, the ratio of Al/Co is 10–500, preferably 25–75 moles of Al compound per mole of Co compound, and the halogenated hydrocarbon is present in a molar ratio of 50–5,000, preferably 50–500 moles per mole of cobalt or nickel. Where Al/Co ratio is specified, this may be interpreted also as referring to Al/Ni ratio.

The cyclized product generally has a molecular weight between 10,000 and 100,000, preferably between 20,000 and 70,000. The melting points are generally higher than 170° C. and the polymers have decomposition temperatures of 450° C. or higher. They are useful as thermosetting resins using peroxides and other free radical generating compounds as curing agents. Various fillers and modifiers may be used in such resins, such as graphite, clay, fiberglass, etc.

Preferred halogenated hydrocarbons for this invention are carbon tetrachloride, chloroform and ethylene dichloride. However other halogenated hydrocarbons may be used such as carbon tetrabromide, bromoform, ethylene dibromide, 1,2-dichloropropane, 1,2-dichlorobutane, 1,3-dibromopentane, 1,3,5-trichlorohexane, 1,2-diiodopropane, 2,3-difluorobutane, benzylchloride, alpha,beta-dichlorostyrene, (trichloromethyl)benzene, 2,3,4-alpha-tetrachloro-toluene, 1,2-dibromocyclohexane, 1,4-dichloro-cyclohexane, etc.

A notable advantage of the present invention is the fact that high concentrations of monomer and polymer, that is 25–40 percent concentration or more, are permissible without gelation whereas other systems of cyclization require dilute concentrations to avoid gelation.

A number of Co and Ni compounds used in the practice of this invention are insoluble in both aromatic and aliphatic hydrocarbons. Nonetheless, polymerization may be conducted by solution or suspension of the cobalt or nickel component in aromatic hydrocarbons, such as benzene, toluene, xylene, etc., and also in aliphatic hydrocarbons, such as hexane, heptane, octane, decane, cyclohexane, cycloheptane, etc. If desired, the polymerization may be conducted in liquid butadiene.

Typical of the cobalt salts that may be used in the catalyst system of this invention are both cobaltous and cobaltic salts such as the halides, carboxylates, thiocarboxylates, carbonates, etc., e.g., $CoCl_2$, $CoCl_3$, $CoBr_2$, $CoBr_3$, $CoI_2$, $CoI_3$, $CoF_2$, $CoF_3$, Co diacetate, $CoCo_3$, Co diformate, Co dipropionate, Co dihexoate, Co dioctoate, Co dinaphthenate, Co bis (dithioacetate), Co bis (dithiocarbamate), Co bis (mercaptobenzothiazole), Co thiocarbonate, etc. The corresponding Ni compounds are also suitable.

Also useful are salts of carboxylic and thiocarboxylic acids which also contain keto or thioketo or nitrogen groups therein with which the cobalt may be complexed in addition to being attached as a salt component. These are referred to herein as salt-complexes. Typical nitrogen groups that may be present for such complexing purposes are: primary, secondary or tertiary amino groups, i.e., —NH$_2$, —NH—, or N—, respectively; the aldimino group, —CH=NR'; the ketimino group, >C=NR', the nitro group —NO$_2$; and the nitroso group, —N=O, etc., wherein R' is hydrogen or a hydrocarbon group as defined above for R. Furthermore, a complexing nitrogen does not need to be in the form of a tertiary amine, but may be also in the form of secondary and primary amines as well as in the form of other nitrogen groups as listed above, provided they meet the other limitations or requirements of this invention.

Preferred among the salt-complex formers are the aminoacids, such as:
picolinic acid, C$_5$H$_{10}$N(COOH);
glycine, NH$_2$CH$_2$COOH;
alanine, CH$_3$CH(NH$_2$)COOH,
aminobutyric acid, CH$_3$CH$_2$CH(NH$_2$)COOH;
threonine, CH$_3$CH(OH)CH(NH$_2$)COOH;
norvaline, CH$_3$CH$_2$CH$_2$(NH$_2$)COOH;
valine, (CH$_3$)$_2$CHCH(NH$_2$)COOH;
methionine, CH$_3$SCH$_2$CH$_2$CH(NH$_2$)COOH;
leucine, (CH$_2$)$_2$CHCH$_2$CH(NH$_2$)COOH;

aspartic acid, H$_2$N—CHOOH
            |
            CH$_2$OOH;

n,n-dimethyldithiocarbamic acid, (CH$_2$)$_2$NCSSH;
N-acetylanthranilic acid, o-CH$_3$CONHC$_6$H$_4$COOH;

mercaptobenzothiazole, $C_6H_4\begin{array}{c}N\\ \diagdown\\ S\end{array}\!\!\!\!\!\begin{array}{c}\\ \diagup\end{array}\!\!\!C-SH$ hippuric acid, C$_6$H$_5$CONHCH$_2$COOH;

glutamic acid, NH$_2$
               |
               CHCOOH
               |
               CH$_2$COOH;

lysine, NH$_2$(CH$_2$)$_4$CH(NH$_2$)COOH;
1,2-diaminopropionic acid, NH$_2$CH$_2$CH(NH$_2$)COOH;
aminopimelic acid, HOOC(CH$_2$)$_4$CH(NH$_2$)COOH;
betaaminovaleric acid, CH$_2$CH$_2$CH(NH$_2$)CH$_2$COOH;
2,6-diamino-4-hydroxy-caproic acid, NH$_2$CH$_2$CH(OH)CHCH$_2$CH(NH$_2$)COOH;
hydroxyethyl glycine, HOCH$_2$CH$_2$NHCH$_2$COOH;
aminoethyl glycine, NH$_2$CH$_2$CH$_2$NHCH$_2$COOH;
iminodiacetic acid, HN(CH$_2$COOH);
iminodipropionic acid, HN(CH$_2$CH$_2$COOH)$_2$;
aminoethyliminoacetic acid, H$_2$NCH$_2$CH$_2$N(CH$_2$COOH)$_2$,
hydroxyethyliminediacetic acid, HOCH$_2$CH$_2$N(CH$_2$COOH)$_2$,
hydroxypropyliminodiacetic acid, HO(CH$_2$)$_3$N(CH$_2$COOH)$_2$;
as well as 3-aminotyrosine, canavanine, 3-4-hydroxylphenylalamine, ethonine, ethonine sulfone, citrulline, creatine, cysteic acid, cystine, dibromothyromine, glycocyanine, histidine, homocystine, hydroxyproline, methylhistidine, pennicillamine, pyroglutamic acid, thienylalanine, carboxymethyl aspartic acid, etc.

Amino acids preferred in the practice of this invention are the aliphatic amino acids having no more than about 20 carbon atoms therein, and preferably having an amine group separated from a carboxylic group by no more than 2 carbon atoms. The amino acids and their derivatives can have a plurality of amino and carboxylic groups therein and also can contain other functional groups therein which do not interfere with and, in some cases, even may enhance the complexing or chelating tendencies of the compound.

Generally the salt is formed which has two acid groups attached to one cobalt or nickel atom and the cobalt or nickel is furthermore complexed or chelated with the nitrogen.

It is also advantageous, particularly where it is desired to have the cobalt or nickel component in solution, to use complexing agents in which the keto, thioketo or nitrogen-containing group is in a separate compound. Suitable compounds for this purpose include beta-diketones of the formula:

$$R'-\underset{\underset{O}{\|}}{C}-C(R')_2-\underset{\underset{O}{\|}}{C}-OR'$$

wherein R' is as defined above. Typical examples of these are acetylacetone and ethyl acetoacetate which form complexes with cobalt salts.

Nitrogen-containing compounds are those which contain the various nitrogen-containing groups listed above for the salt-complex formers. In addition to the various compounds listed above, other complex formers are tertiary phosphines, such as triphenyl phosphine, tributyl phosphine, etc., N-N-diethylformamide, etc., alcohols such as methanol, ethanol, propanol, ethylene glycol, etc. Particularly preferred complexing agents for this purpose are compounds containing nitrogen and oxygen or sulfur, preferably with no more than 2 carbon atoms separating the nitrogen from the oxygen or sulfur. Typical of these are: N-methylpyrrolidone, caprolactam, pyrrolidone, o,m or p-aminoacetophenone, o,m or p-aminoacetophenone, N-methyl-aminobenzophenone, 2-aminocyclohexanone, 4-aminocyclohexanone, N-methyl-2-aminocyclohexanone, N,N-dimethylcyclohexanone, etc., and the corresponding thioketo compounds, such as N-Me-thiopyrrolidone, thiocaprolactam, amino-thioacetophenone, etc.

When a separate compound, either cyclic or linear, is used to form a cobalt or nickel complex, such complex former may be used in a proportion of 1–30 moles per mole of cobalt or nickel compound, preferably 1–16 moles when a pyrrolidone is used and 1–6 moles when a lactam is used. In the carboxylates and thiocarboxylates used herein, it is generally not necessary to have more than 20 carbon atoms in such compounds.

Reducing agents that may be used in the practice of this invention comprise trihydrocarbyl aluminum, dihydrocarbyl aluminum halide, dihydrocarbyl aluminum hydride and hydrocarbyl aluminum dihalide compounds. Alkyl groups of 1–8 carbon atoms are advantageous in the above compounds but even larger groups or aromatic or cycloaliphatic groups such as phenyl, tolyl, xylyl, naphyhyl, cyclohexyl, cycloheptyl, etc., may also be present in place of the alkyl groups in the respective compounds. Hydrocarbyl groups of at least 3 carbon atoms are advantageous, preferably at least 4 carbon atoms, since aluminum compounds having less than three carbon atoms require much lower temperatures than required with higher R groups to give practical yields of polymer produced.

Typical trihydrocarbyl aluminum compounds that may be used include: trimethyl aluminum, triethyl aluminum, tripropyl aluminum, tributyl aluminum, triamyl aluminum, trihexyl aluminum, trioctyl aluminum, triphenyl aluminum, tricyclohexyl aluminum chloride, diisobutyl phenyl aluminum, diisoamyl cyclohexyl aluminum, etc.

Other reducing agents that may be used in the practice of this invention include mono and dihydrocarbyl aluminum halides and dihydrocarbyl aluminum hydrides.

Typical dihydrocarbyl aluminum halides that may be used include: dimethyl aluminum chloride, diethyl aluminum chloride, dipropyl aluminum chloride, dibutyl aluminum chloride, diamyl aluminum bromide, dihexyl aluminum iodide, dioctyl aluminum fluoride, diphenyl aluminum chloride, dicyclohexyl aluminum chloride, diisobutyl aluminum bromide, diisoamyl aluminum chloride, etc.

Typical monohydrocarbyl aluminum halides include methyl Al dichloride, ethyl Al dibromide, propyl Al diiodide, butyl Al difluoride, butyl Al dichloride, hexyl Al dichloride, octyl Al difluoride, phenyl Al dichloride, cyclohexyl Al dichloride, etc.

Typical dihydrocarbyl aluminum hydrides include dimethyl Al hydride, diisobutyl Al hydride, diisoamyl Al hydride, diphneyl Al hydride, dicyclohexyl Al hydride, etc.

Monomers suitable for the practice of this invention comprise non-cyclic conjugated diene hydrocarbons having 4-8 carbon atoms. Typical of these are butadiene-1,3, isoprene, 2,3-dimethylbutadiene, pentadiene-1,3, etc. Two or more of these dienes may be used to form copolymers or vinyl arene compounds may be used to form copolymers, in which case at least 50 percent by weight of the copolymer is derived from the diene. Suitable vinyl arene compounds include styrene, vinyl toluene, alpha methyl styrene, vinyl napthalene, etc.

Polymerization temperatures are advantageously in the range of $-30°$ to $50°$ C., preferably $5°$ to $30°$ C. and substantial polymerization is generally completed within 5-6 hours. Higher temperatures generally result in a reduction of the amount of trans-1,4 polymer produced. The polymerization is carried out in an anhydrous system under an inert atmosphere such as nitrogen. The product is coagulated by the addition of methanol, ethanol or isopropanol and stabilized by an antioxidant.

The polymerization is advantageously conducted in a hydrocarbon medium in a concentration of 10-60 percent, preferably 15-35 percent by weight of monomer. The hydrocarbon solvent is preferably a saturated aliphatic or cycloaliphatic compound of 4-10 carbon atoms, such as butane, pentane, hexane, heptane, octane, decane, cyclopentane, cyclohexane, methylcyclohexane, cycloheptane, etc. When an aromatic hydrocarbon is used, such as toluene, xylene, benzene, ethylbenzene, etc., some of the solvent is grafted to the polymer. Therefore, in cases where such addition is permissible or desirable, aromatic hydrocarbon solvents may be used.

In the cyclized polymers of this invention at least 80 percent of the diene repeating unit should be in a cyclized structure, preferably at least 90 percent. This means that the residual unsaturation is less than 20 percent, preferably less than 10 percent and in many cases 2 percent or less. However where the product is to be used in molding compositions for curing through its unsaturation, that is by free radical curing, the unsaturation is advantageously at least 2 percent, preferably at least 5 percent of what it would have been without cyclization. However even with very low amounts of unsaturation, cross-linking may be effected by the action of free radicals on the cyclic structures in a manner similar to a grafting mechanism.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

Two polymerizations are conducted using 28 oz. bottles previously dried and flushed out with dry nitrogen. To each bottle there is added 366 grs. of a toluene solution containing 73.2 grs. of isoprene (20%). To each solution maintained at $300°$ C., is then added 0.15 millimoles of a $CoCl_2$ complex in toluene comprising 16 moles of N-Methyl-pyrrolidone per mole of $CoCl_2$. The cobalt chloride complex is soluble in the reaction medium and gives a blue color. Two hundred fifty (250) millimoles of $CCl_4$ is added and then this composition is reduced by adding 15 millimoles of triisobutyl aluminum. This mixture is agitated overnight at $30°$ C. The Al/Co ratio is 100/1 and the $CCl_4$/Co ratio is 1667/1. A soluble polymer is obtained which is coagulated by the addition of methanol, then isolated and dried. The yields are 77 gms. and 73 grs. of polymer respectively which represent yields of 105% and 99.73% respectively; $C^{13}$ Nuclear Magnetic Resonance (NMR) analyses show 7% toluene in the first polymer with the balance comprising polyisoprene of which 98% is cyclized polyisoprene and 2% is unsaturated polymer, and 6.3% toluene in the second polymer with the polyisoprene portion being 97.6% cyclized polyisoprene and 2.4% unsaturated polyisoprene. The products have melting points in the range of $170°-180°$ C. Upon compression molding with 1% benzoyl peroxide each polymer in combination with 25 and 50 percent by weight respectively of graphite gives hard molded products.

EXAMPLE II

The procedure of Example I is repeated using 31 gms. of butadiene as a 10% solution in toluene, 0.1 millimole of the $CoCl_2$ complex, 10 millimoles of ethyl aluminum dichloride and 250 millimoles of $CCl_4$. The Al/Co molar ratio is 100/1 and the $CCl_4$/Co ratio is 2500/1. A yield of 61 gms. of polymer is obtained. The NMR analysis shows the polymer contains 30 gms. of grafted toluene with the remainder being substantially all cyclized polybutadiene and about 2% unsaturated polybutadiene. The melting point is $198°$ C. The product is moldable as in Example I to a hard molded product.

EXAMPLE III

The procedure of Example II is repeated using 296 gms. of a blend of 44 gms. of butadiene in toluene, 0.21 millimole of Ni octanoate, 21 millimoles of triisobutyl-aluminum and 300 millimoles of $CCl_4$ with polymerization conducted overnight at $5°$ C. The Al/Ni ratio is 100/1 and the $CCl_4$/Ni ratio is 1429/1. The polymer yield is 53 gms., which upon analyses shows 17% toluene with the balance being polybutadiene of which 99.5% is cyclized polybutadiene and 0.5% is unsaturated polybutadiene. This is moldable as in Example II.

EXAMPLE IV

The procedure of Example II is repeated with a blend of 23 gms. (10%) butadiene in toluene, 115 millimoles of $CCl_4$, 6.5 grs. of styrene, 0.15 millimole of the $CoCl_2$ complex, and 15.0 millimoles of triisobutyl aluminum. The Al/Co molar ratio is 100 and the $CCl_4$/Co molar ratio is 767/1. Polymerization is conducted overnight at 30° C. The polymer yield is 33 gms. Analysis shows a total of 41.5% combined aromatic (toluene and styrene). The copolymer portion comprises 84.7% cyclized polybutadiene, 8.9% unsaturated polybutadiene and 6.4% styrene. The product is moldable similarly as described in Example II.

EXAMPLE V

The procedure of Example I is repeated four times using 61 gms. of butadiene as a 24% solution in hexane instead of toluene. The amount of $CCl_4$ is held constant through the four experiments at 150 millimoles, and the amount of Co complex and triisobutyl aluminum are varied as shown below. Polymerization is conducted overnight at 30° C.

|     | Co Complex Millimole | Al(C$_4$H$_9$)$_3$ Millimole | Al/Co | CCl$_4$/Co | Yield Gms. |
| --- | --- | --- | --- | --- | --- |
| (1) | 0.05 | 5 | 100/1 | 3000/1 | 58 |
| (2) | 0.1 | 10 | 100/1 | 1500/1 | 60 |
| (3) | 0.15 | 15 | 100/1 | 1000/1 | 56 |
| (4) | 0.5 | 20 | 40/1 | 300/1 | * |

*Very low yield of very low molecular weight product.

EXAMPLE VI

The procedure of Example I is repeated using a blend of 31 gms. of butadiene, 31 gms. of isobutylene and 248 gms. of toluene, together with 0.15 millimole of the $CoCl_2$ complex, 200 millimoles of $CCl_4$ and 15 millimoles of triisobutylaluminum. Polymerization overnight at 30° C. gives 50 gms. of product for which analysis shows 58.4% isobutylene and the polybutadiene portion shows 62% cyclized and 38% unsaturated polybutadiene. Molding of the product as in Example II gives a hard molded product.

EXAMPLE VII

The procedure of Example I is repeated using a blend of 14 gms. alphamethylstyrene, 45 gms. of butadiene and 233 gms. of toluene with 0.15 millimole of the $CoCl_2$ complex, 200 millimoles of $CCl_4$ and 15 millimoles of triisobutylaluminum. Polymerization overnight at 5° C. gives 61 gms. of product which by analysis is shown to have 74.2% alphamethylstyrene and the polybutadiene portion has 91% cyclized and 9% unsaturated structure. Molding of the product as in Example II gives a hard molded product.

EXAMPLE VIII

The procedure of Example I is repeated with similar results using an equivalent amount of cobalt dipicolinate as the cobalt component.

EXAMPLE IX

The procedures of Examples I and III are repeated a number of times with satisfactory results using as the salt complex equivalent amounts respectively of:
(a) $CoCl_2$.6 caprolactam
(b) $CoCl_2$.16 pyrrolidone
(c) $CoCl_2$.10 p-aminoacetophenone
(d) $CoCl_2$.10 N-methyl-thiopyrrolidone
(e) $CoCl_2$.6 thiocaprolactam
(f) $CoCl_2$.2 acetylacetone
(g) $CoCl_2$.2 acetoacetate
(h) $NiCl_2$.16 N-methylpyrrolidone
(i) $NiCl_2$.6 caprolactam

EXAMPLE X

The procedure of Example VIII is repeated a number of times with satisfactory results using as the cobalt or nickel component 0.9 millimoles of the following together with Al/Co or Al/Ni ratios of 100/1 and $CCl_4$/CO or $CCl_4$/Ni ratios of 200/1:
(a) Co dihippurate
(b) Co bis(N-acetyl-anthranilate)
(c) Co bis(N,N-dimethyldithiocarbamate)
(d) Co diglycinate
(e) Co dialaninate
(f) Anhydrous cobaltous chloride
(g) Cobaltous carbonate
(h) Cobaltous diacetate
(i) Cobaltous bis(dithioacetate)
(j) Cobaltous dioctoate
(k) Cobaltous dinaphthoate
(l) Ni dihippurate
(m) Ni bis(N-acetyl-anthranilate)
(n) Ni bis(N,N-diemthyldithiocarbamate)

EXAMPLE XI

The procedures of Examples I and III are repeated a number of times with satisfactory results using in place of the triisobutyl aluminum equivalent amounts respectively of:
(a) Triisoamyl aluminum
(b) Diisobutyl phenyl aluminum
(c) Triisopropyl aluminum
(d) Trihexyl aluminum
(e) Dihexyl ethyl aluminum
(f) Diphenyl isobutyl aluminum
(g) Cyclohexyl diamyl aluminum
(h) Diisoamyl ethyl aluminum
(i) Diisobutyl propyl aluminum
(j) Diisoamyl propyl aluminum
(k) Diphenyl ethyl aluminum

EXAMPLES XII

The procedures of Examples I and III are repeated a number of times with satisfactory results using in place of the aluminum compound in those examples equivalent amounts respectively of:
(a) Diisoamyl aluminum chloride
(b) Diisobutyl aluminum bromide
(c) Diisopropyl aluminum iodide
(d) Dihexyl aluminum chloride
(e) Dihexyl aluminum fluoride
(f) Phenyl aluminum dichloride
(g) Cyclohexyl aluminum dichloride
(h) Isoamyl aluminum difluoride
(i) Diisobutyl aluminum hydride
(j) Diisoamyl aluminum hydride (k) Diphenyl aluminum hydride

EXAMPLE XIII

The procedure of Example I is repeated a number of times with satisfactory results using in place of the $CoCl_2$ equivalent amounts respectively of:
(a) $CoCl_3$
(b) $Co(COOCH_3)_2$
(c) $CO(OOCC_6H_5)_2$
(d) $CoBr_2$
(e) $CoCO_3$
(f) $Co(SSCCH_3)_2$
(g) $Ni(OOCCH_3)_2$
(h) $Ni(OOCC_6H_5)_2$

EXAMPLE XIV

The procedures of Examples I and III are repeated with satisfactory results using in place of the $CCl_4$ as the halogenated hydrocarbon equivalent amounts respectively of the following:
(a) Chloroform
(b) Carbon tetrabromide
(c) Bromoform
(d) 2,3-Difluorobutane
(e) 1,4-Dichlorocyclohexane
(f) (Trichloromethyl)-benzene While certain features of this invention have been described in detail with respect to various embodiments thereof, it will of course be apparent that other modifications can be made within the spirit and scope of this invention and it is not intended to limit the invention to the exact details shown except insofar as they are defined in the claims.

The invention claimed is:

1. The process for the preparation of a cyclized polymer containing at least 50 percent by weight of a conjugated hydrocarbon diene in the polymer molecule thereof and at least 80 percent of said diene being in a cyclized form which comprises polymerizing at a temperature of 5°–50° C. a liquid monomeric composition containing at least 50 percent by weight of said diene as the monomeric portion thereof in the presence of a catalyst composition consisting essentially of:
(a) a cobalt-containing or nickel-containing component selected from the class consisting of halides, carboxylates, thiocarboxylates, carbonate, thiocarbonate and complexes of said halides, carboxylates, thiocarboxylates, carbonate and thiocarbonate, said complex being formed between the cobalt or nickel and a nitrogen, keto or thioketo group in the same compound or with a separate cyclic compound having both a nitrogen and keto or thioketo group therein, said component being used in a proportion of 0.01–1 millimoles per 100 grams of conjugated diene;
(b) a reducing agent selected from the class consisting of $AlR_3$, $AlR_2X$, $AlRX_2$ and $AlR_2H$ wherein R is a hydrocarbon radical of 1–8 carbon atoms, and X is halogen, said agent being used in a proportion of 10–500 moles per mole of cobalt or nickel containing component; and
(c) A halogenated hydrocarbon containing 1–10 carbon atoms and 1–6 halogen atoms per molecule with at least one of said halogen atoms being attached to an aliphatic carbon atom in said halogenated hydrocarbon, said halogenated hydrocarbon being used in a proportion of 50–5000 moles per mole of said cobalt-containing or nickel-containing component.

2. The process of claim 1 in which said cobalt-containing or nickel-containing component is a cobalt or nickel compound complex of a cyclic compound having an amino nitrogen and a keto or thioketo group therein.

3. The process of claim 2 in which said complex is one of cobaltous chloride and N-Methyl-pyrrolidone.

4. The process of claim 3 in which said reducing agent is a trialkyl aluminum.

5. The process of claim 2 in which said reducing agent is a trialkyl aluminum.

6. The process of claim 2 in which said reducing agent is a tributyl aluminum.

7. The process of claim 5 in which said reducing agent is triisobutyl aluminum.

8. The process of claim 5 in which said complex former is N-methylpyrrolidone and is used in a proportion of 1–16 moles per mole of Co or Ni salt.

9. The process of claim 8 in which said salt is cobaltous chloride.

10. The process of claim 2 in which said complex former is caprolactam and is used in a proportion of 1–6 moles per mole of Co or Ni salt.

11. The process of claim 10 in which said salt is cobaltous chloride.

12. The process of claim 2 in which 1–16 moles of cyclic amino compound is used per mole of Co or Ni compound; said cobalt or nickel compound is used in a proportion of 0.02–0.1 millimoles per 100 grams of butadiene; the proportion of reducing agent is 25–75 moles of Al compound per mole of Co or Ni compound; and the proportion of halogenated hydrocarbon is 50–500 moles per mole of Co or Ni compound.

13. The process of claim 2 in which said reducing agent is a trialkyl aluminum compound, said cyclic compound is N-methyl-pyrrolidone used in a proportion of 1–16 moles per mole of Co or Ni compound, and said cobalt or nickel compond is cobaltous chloride.

14. The process of claim 2 in which said reducing agent is a trialkyl aluminum, said cyclic compound is caprolactam used in a proportion of 1–6 moles of caprolactam per mole of Co or Ni compound, and said cobalt or nickel compound is cobaltous chloride.

15. The process of claim 1 in which said component is Co dipicolinate.

16. The process of claim 1 in which said component is Co dihippurate.

17. The process of claim 1 in which said component is Co bis(N-acetylanthranilate).

18. The process of claim 1 in which said component is Co bis(N,N-dimethyldithiocarbamate).

19. The process of claim 1 in which said component is Co bis(benzothiazolin-2-thiolate).

20. The process of claim 2 in which said halogenated hydrocarbon is carbon tetrachloride.

21. The process of claim 2 in which said halogenated hydrocarbon is ethylene dichloride.

22. The process of claim 2 in which said halogenated hydrocarbon is chloroform.

23. The process of claim 12 in which said halogenated hydrocarbon is carbon tetrachloride.

24. The process of claim 12 in which said halogenated hydrocarbon is ethylene dichloride.

25. The process of claim 12 in which said halogenated hydrocarbon is chloroform.

26. The process of claim 1 in which said halogenated hydrocarbon is carbon tetrachloride.

27. The process of claim 1 in which said halogenated hydrocarbon is ethylene dichloride.

28. The process of claim 1 in which said halogenated hydrocarbon is chloroform.

29. The process of claim 2 in which said reducing agent is trialkyl aluminum.

30. The process of claim 2 in which said reducing agent is triisobutyl aluminum.

31. The process of claim 1 in which said reducing agent is a trialkyl aluminum.

32. The process of claim 1 in which said reducing agent is triisobutyl aluminum.

* * * * *